United States Patent
Hendrix

(10) Patent No.: US 7,688,000 B2
(45) Date of Patent: Mar. 30, 2010

(54) METHOD AND DEVICE FOR DRIVING A METAL HALIDE LAMP

(75) Inventor: Johan Leopold Victorina Hendrix, Turnhout (BE)

(73) Assignee: Koninklijke Philips Electronics N.V., Eindhoven (NL)

( * ) Notice: Subject to any disclaimer, the term of this patent is extended or adjusted under 35 U.S.C. 154(b) by 831 days.

(21) Appl. No.: 10/578,649

(22) PCT Filed: Nov. 11, 2004

(86) PCT No.: PCT/IB2004/052393

§ 371 (c)(1),
(2), (4) Date: May 9, 2006

(87) PCT Pub. No.: WO2005/048661

PCT Pub. Date: May 26, 2005

(65) Prior Publication Data

US 2007/0114943 A1    May 24, 2007

(30) Foreign Application Priority Data

Nov. 14, 2003  (EP) .................................. 03104204
Jul. 26, 2004  (EP) .................................. 04103561

(51) Int. Cl.
*H05B 37/02* (2006.01)
(52) U.S. Cl. ...................... 315/224; 315/307; 315/308; 315/DIG. 5
(58) Field of Classification Search ................ 315/224, 315/219, 291, 307, 308, DIG. 5, DIG. 7, 315/56

See application file for complete search history.

(56) References Cited

U.S. PATENT DOCUMENTS

| | | | | |
|---|---|---|---|---|
| 5,113,085 A | * | 5/1992 | Schafer et al. | ............... 327/398 |
| 5,436,532 A | * | 7/1995 | Benard et al. | ................ 315/244 |
| 5,834,903 A | * | 11/1998 | Christian | ..................... 315/219 |

* cited by examiner

*Primary Examiner*—David Hung Vu

(57) ABSTRACT

A gas discharge lamp (2) is operated with an alternating current. A positive lamp current ($I_P$) is generated with a positive current intensity ($I_P$) for a positive duration ($\tau_p$). A negative lamp current ($I_N$) is generated with a negative current intensity ($I_N$) for a negative duration ($\tau_N$). A duty cycle ($D=\tau_p/(\tau_p+\tau_N)$) differs from 50%. A current ratio ($R=I_P/I_N$) differs from 1.

34 Claims, 10 Drawing Sheets

METHOD AND DEVICE FOR DRIVING A METAL HALIDE LAMP

The present invention relates in general to a method and device for driving a gas discharge lamp, specifically a HID lamp, more specifically a metal halide lamp. Although many of the aspects of the present invention are also applicable to different lamp types, the present invention relates specifically to metal halide lamps with a relative large aspect ratio, i.e. the ratio of length/diameter is larger than 3 or even 4; conventionally, the aspect ratio is typically in the order of 2.

Gas discharge lamps are commonly known. In general, they comprise a light transmitting vessel enclosing a discharge chamber in a gastight manner, an ionizable filling and a pair of electrodes located opposite each other in the discharge chamber, each electrode being connected to an associated current conductor, which extends from the discharge chamber through the lamp vessel to the exterior. During operation, a voltage is applied over said electrodes, and a gas discharge occurs between said electrodes causing a lamp current to flow between the electrodes. Although it is possible to drive an individual lamp within a relatively wide range of operating currents, a lamp is typically designed for being operated at a specific lamp voltage and lamp current and thus to consume a specific nominal electric power. At this nominal electric power, the lamp will generate a nominal amount of light. Since HID lamps are commonly known to persons skilled in the art, it is not necessary to discuss their construction and operation here in more detail.

A high-pressure discharge lamp is typically driven by an electronic ballast supplying commutating DC current. An electronic ballast or driver for such a lamp typically comprises an input for receiving AC mains, a rectifier for rectifying the AC mains voltage to a rectified voltage, a DC/DC up converter for converting the rectified voltage to a higher constant voltage, a down converter for converting said higher constant voltage to a lower constant voltage (lamp voltage) and a higher DC current (lamp current), and a commutator for regularly changing the direction of this DC current and the polarity of the DC voltage. The down converter behaves as a current source. Typically, the commutator operates at a frequency in the order of about 100 Hz. Therefore, in principle, the lamp is normally operated at constant current magnitude, the lamp current regularly changing its direction within a very brief time (commutating periods) in a symmetric way, i.e. an electrode is operated as a cathode during 50% of each current period and is operated as anode during the other 50% of each current period. This mode of operation will be indicated as square wave current operation. It should be clear to a person skilled in the art that, on average, the lamp current is zero in square wave current operation.

U.S. Pat. No. 6,369,518 describes a system where the duty cycle is shaped in order to control the temperature of the electrodes and thus the temperature of the coldest spot.

One problem of metal-halide lamps is that their behavior in a horizontal orientation differs from their behavior in a vertical orientation. In a horizontal orientation, the spatial distribution of the particles is almost homogeneous. In a vertical orientation, the spatial distribution of the particles is dependent on the location along the axis of the lamp. This phenomenon, indicated as segregation, is caused by physical effects like convection and diffusion, both determined by the atmospheric condition within the lamp. The amount of segregation depends on circumstances like pressure and type of material of the ionizable filling. The segregation effect increases with increasing electrode spacing, i.e. with increasing aspect ratio.

Since, in a metal-halide lamp, the light is produced by the atoms, segregation has the consequence that the light intensity and light color is not constant anymore along the central axis of the lamp, and that the overall light and technical properties of the lamp will differ from those obtained when operated horizontally.

It is a general objective of the present invention to be able to influence the light-generating capabilities of a metal-halide lamp in its vertical orientation.

More particularly, the present invention aims to influence the efficacy of a metal-halide lamp.

In one aspect, the present invention aims to counteract the effect of segregation, ideally keeping the light intensity and light color along the central axis of the lamp as constant as possible. In a particular objective, the present invention aims to provide a lamp assembly, which automatically maintains a constant efficacy, independent of the lamp orientation.

In another aspect, the present invention aims to influence the intensity and preferably also the color temperature of the light generated by a metal-halide lamp. In a particular objective, the present invention aims to provide a lamp assembly with variable color temperature, which is capable of varying the color temperature over a very large range.

Specifically, the present invention aims to influence lamp characteristics such as efficacy and/or color temperature of a metal-halide lamp, while driving the lamp with a lamp current having a DC component that is maintained at a zero level. In a particular objective, the present invention aims to provide a lamp assembly with variable color temperature, which is capable of varying the color temperature over a very large range while maintaining a zero DC component of the lamp current.

Nevertheless, the principles of the present invention are also applicable for maintaining the DC component of the lamp current at any constant level.

According to an important aspect of the present invention, a metal-halide lamp is operated with a commutating current having a duty cycle D differing from 50% and a current ratio R differing from 1. The duty cycle D and the current ratio R are selected in relation to each other, such that, on average, the DC component of the lamp current has a desired value, preferably zero.

According to another important aspect of the present invention, a metal-halide lamp is operated with a commutating current having a duty cycle D differing from 50% and a current ratio R differing from 1. In order to vary the efficacy and/or the color temperature, the duty cycle D and the current ratio R are varied simultaneously, in such a way that, on average, the DC component of the lamp current is maintained constant, preferably at zero. As a result, depending on lamp type, the efficacy and/or the color temperature will be varied without changing the DC component of the lamp current.

These and other aspects, features and advantages of the present invention will be further explained by the following description with reference to the drawings, in which same reference numerals indicate same or similar parts, and in which:

FIG. 1 schematically shows an embodiment of a metal-halide lamp;

FIG. 2 schematically shows a lamp assembly;

Figure 5:
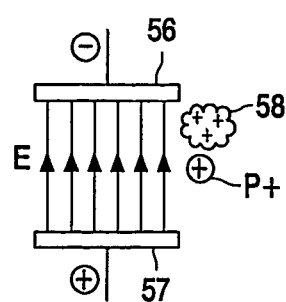
Figure 6:
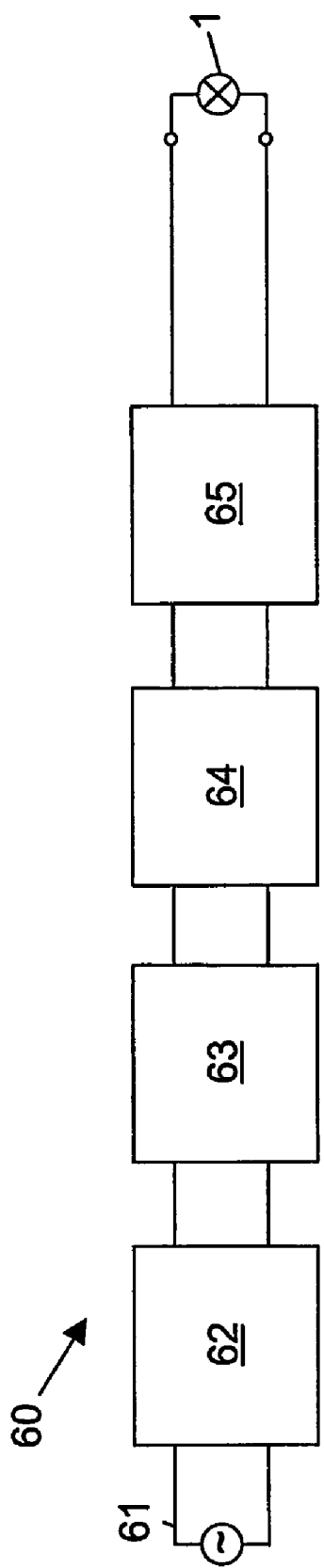
Figure 7A:
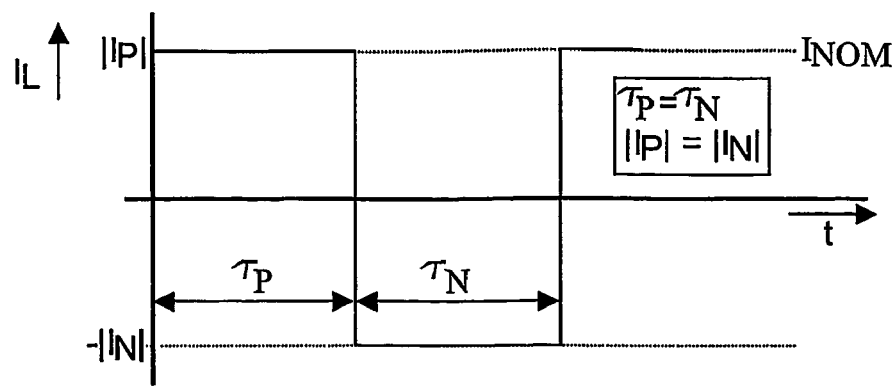
Figure 7B:
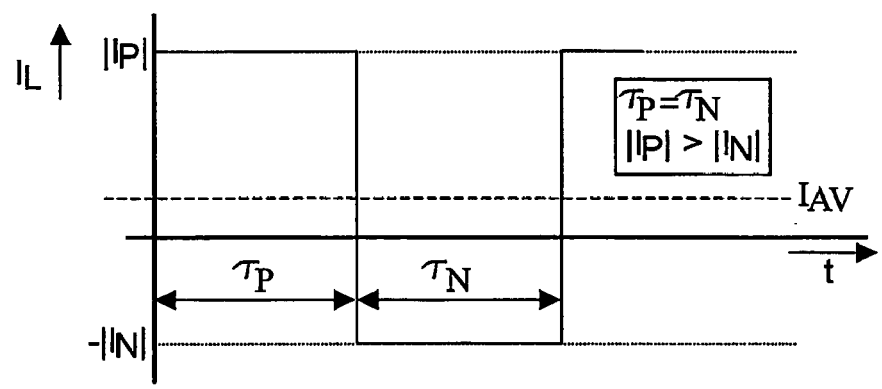
Figure 7C:
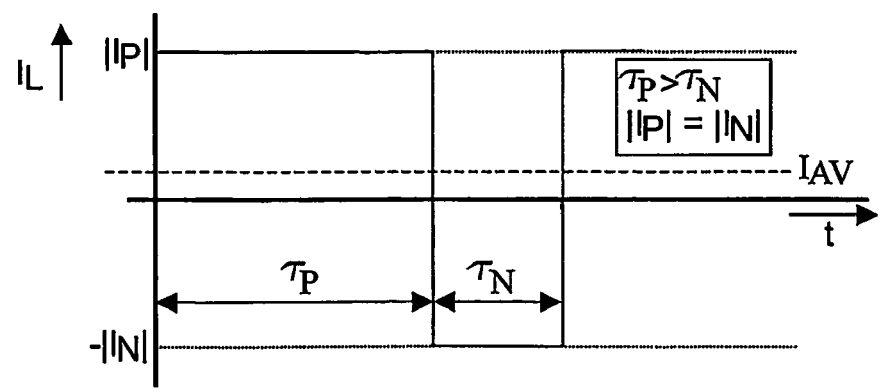
Figure 8:
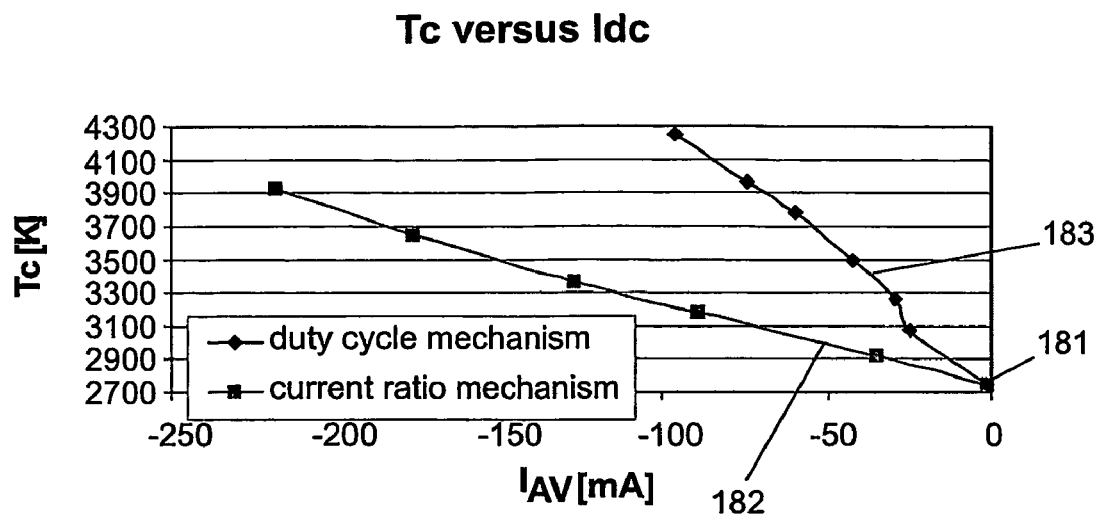
Figure 9:
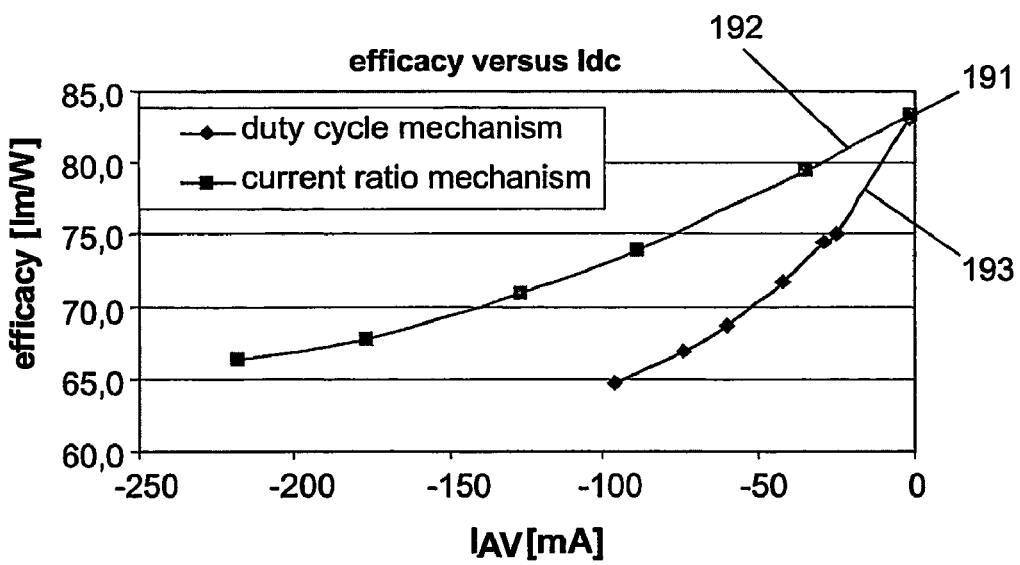
Figure 10:
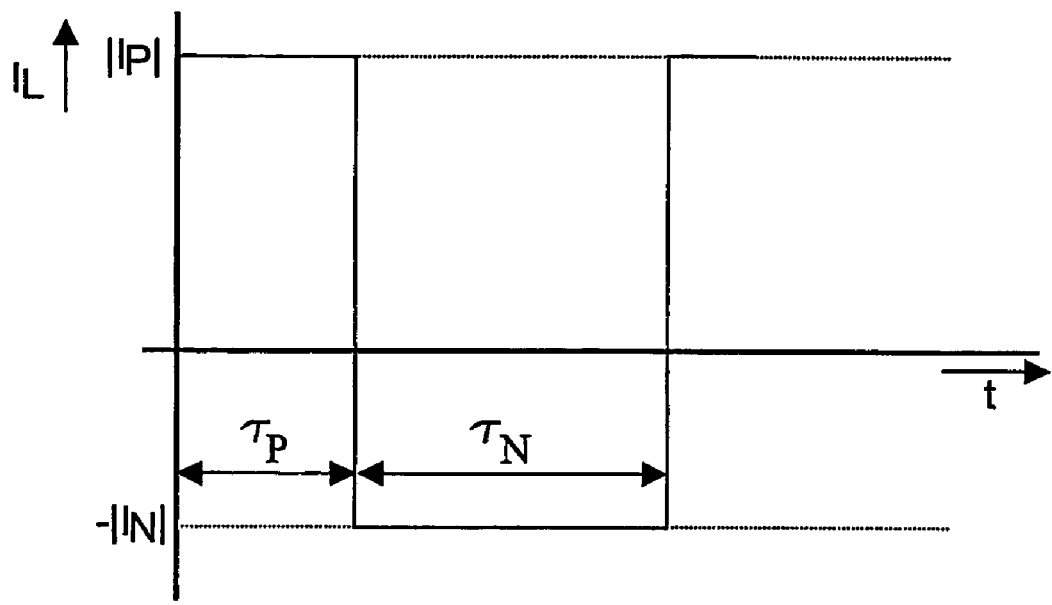
Figure 11:
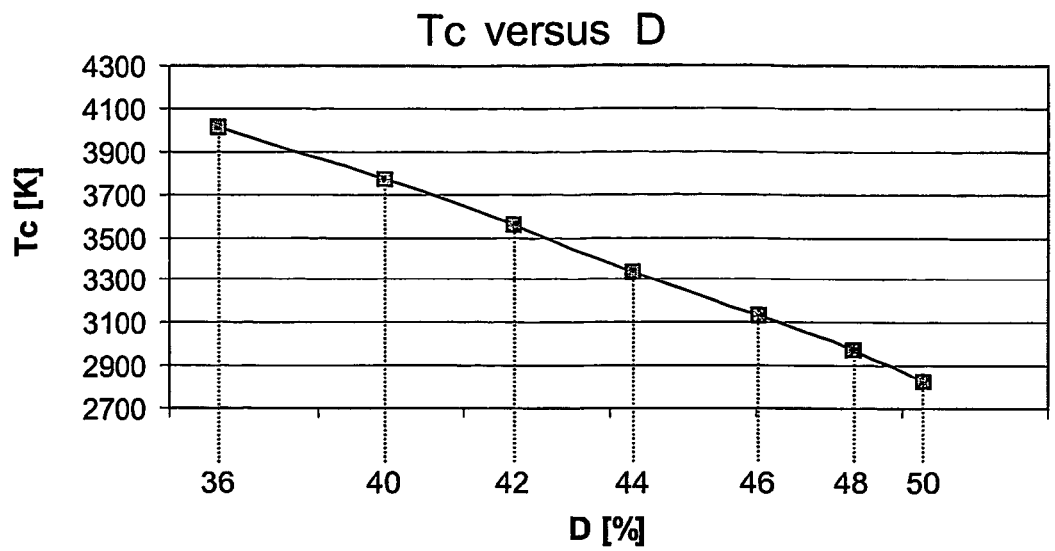
Figure 12:
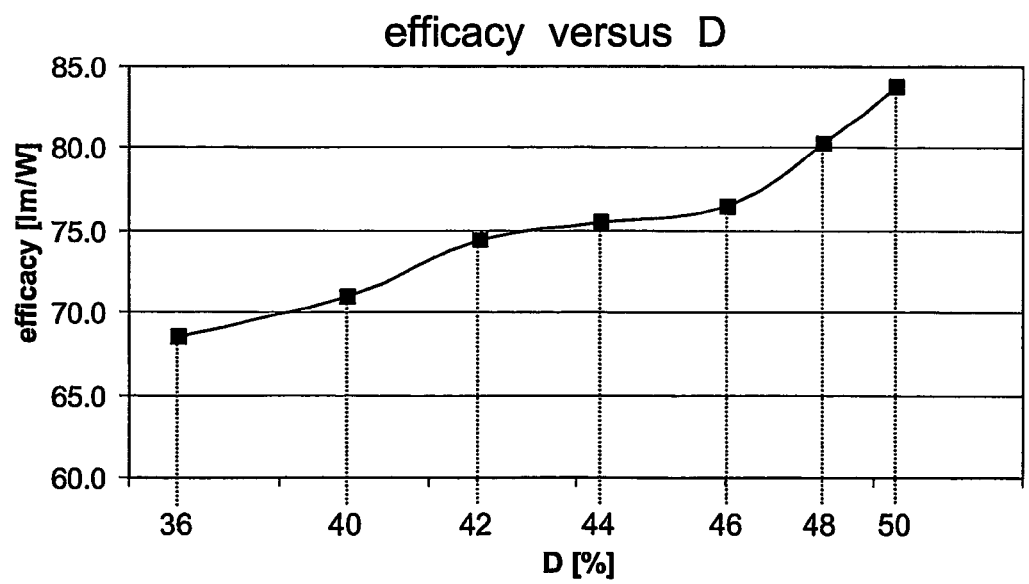
Figure 13:
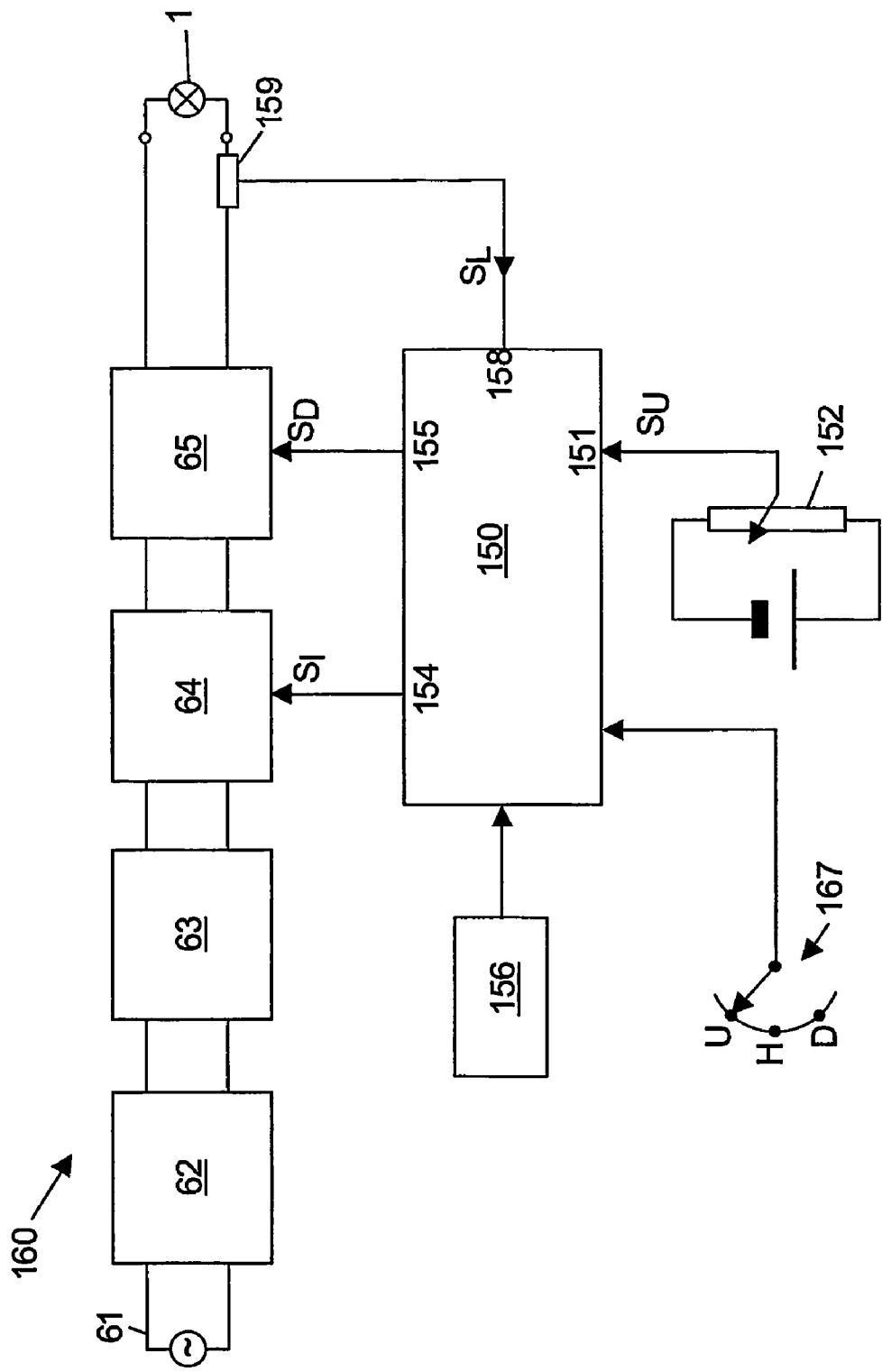
Figure 14:
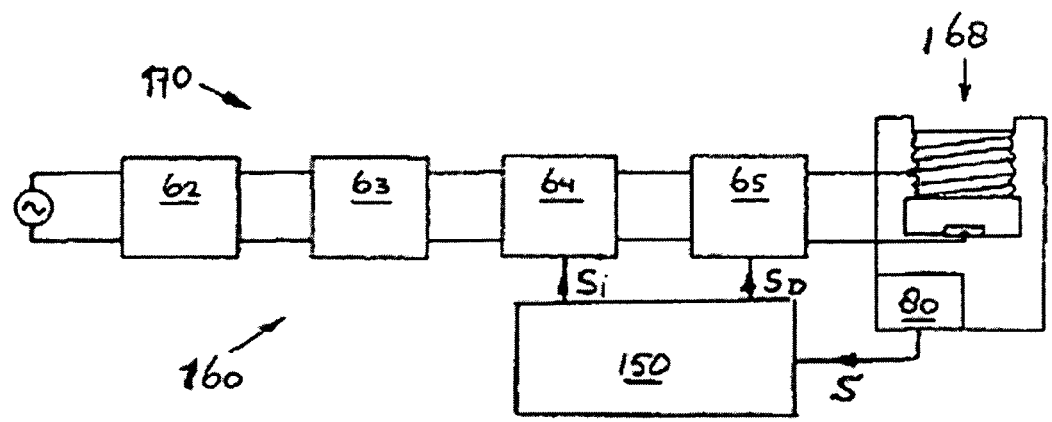
Figure 15:
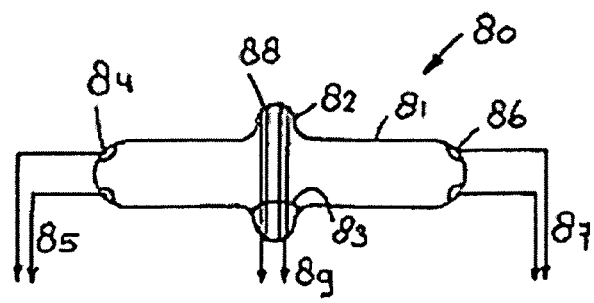

FIG. 5 schematically illustrates ion drift;

FIG. 6 is a block diagram schematically illustrating an electronic ballast;

FIGS. 7A-C are graphs illustrating current waveforms;

FIG. 8 is a graph showing measured results of color temperature as a function of average lamp current;

FIG. 9 is a graph showing measured results of efficacy as a function of average lamp current;

FIG. 10 is a graph comparable to FIGS. 7A-C, illustrating current waveform in accordance with the present invention;

FIG. 11 is a graph showing measured results of color temperature as a function of duty cycle with the current waveform in accordance with the present invention;

FIG. 12 is a graph showing measured results of efficacy as a function of duty cycle with the current waveform in accordance with the present invention;

FIG. 13 is a schematic block diagram of an electronic lamp driver in accordance with the present invention;

FIG. 14 is a schematic block diagram of another electronic lamp driver in accordance with the present invention;

FIG. 15 schematically illustrates an orientation detector.

First, the general operation of a metal-halide lamp, and the consequences of lamp orientation, will be explained with reference to FIGS. 1-4.

Figure 1:
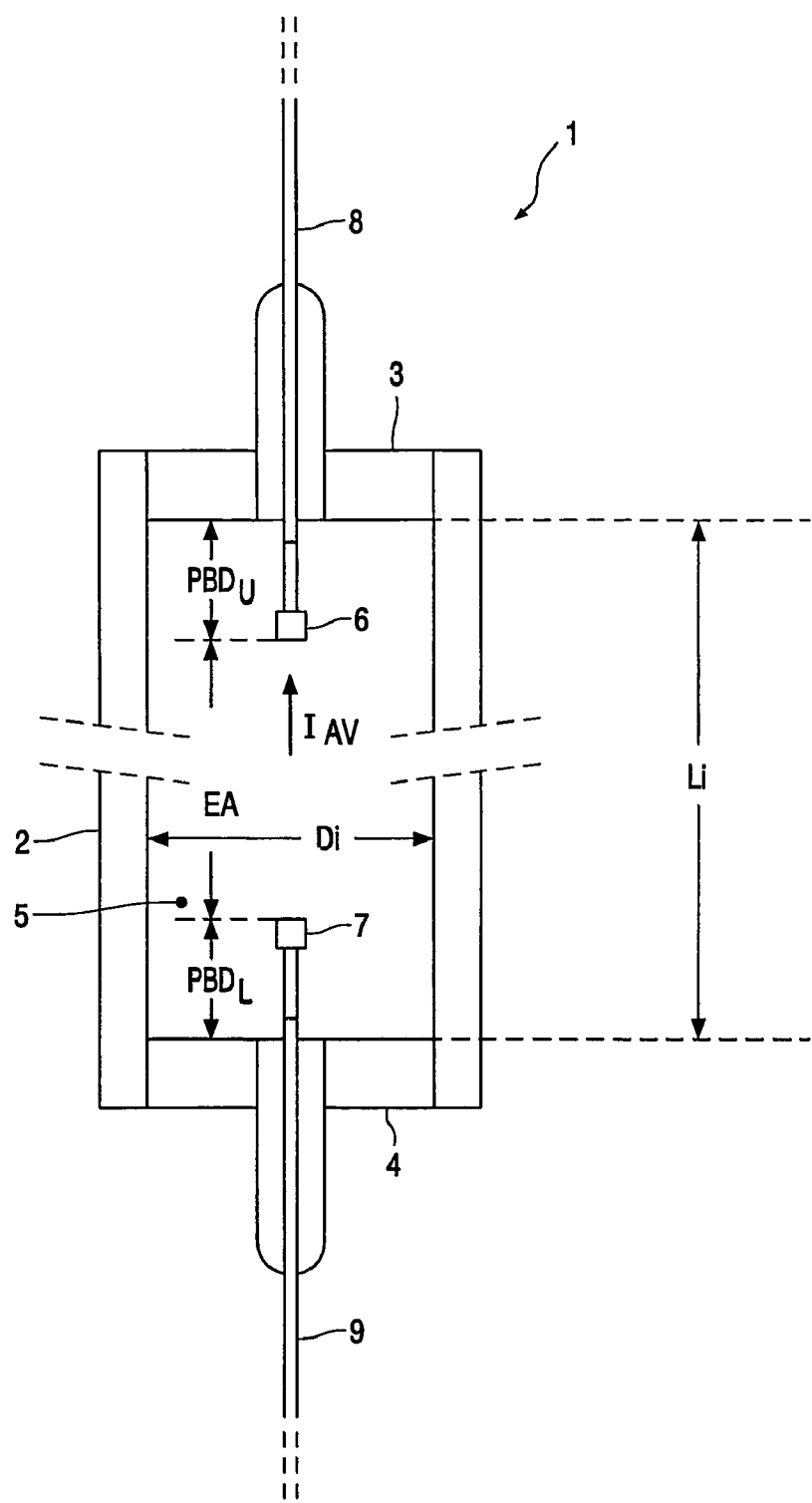

FIG. 1 schematically shows a possible embodiment of a metal-halide lamp, generally indicated at reference numeral 1. The lamp 1 comprises a light transmissive vessel 2, in the embodiment illustrated having a circular cylindrical shape and having an internal diameter Di; however, other shapes are possible, too. Although not essential in the context of the present invention, the vessel 2 is preferably made from ceramic material; as an alternative, the vessel 2 could be made from quartz. At its longitudinal ends, the vessel 2 is closed in a gas-tight manner by plugs or end caps 3, 4 of a compatible material. The vessel 2 and the plugs and/or end caps 3, 4 enclose a discharge chamber 5 having a diameter equal to the internal diameter Di of the vessel 2 and having an axial length Li determined by the distance between the end caps 3 and 4. An aspect ratio AR is defined as the ratio Li/Di.

Inside the discharge chamber 5, two electrodes 6, 7 are arranged at a mutual distance EA, substantially aligned with the central axis of the vessel 2. In a gas-tight manner, electrode conductors 8, 9 extend from the electrodes 6, 7 through the end caps 3, 4, respectively. If the end caps 3, 4 are made from quartz, the conductors 8, 9 may be molten into the quartz. Typically, the electrodes 6, 7 will be made from a material differing from the material of the electrode conductors 8, 9; by way of example, the electrodes 6, 7 may be made from tungsten.

Inside the discharge vessel 2, i.e. in the discharge chamber 5, an ionizable filling is arranged. During steady state operation, the filling typically comprises an atmosphere comprising a substantial amount of mercury (Hg). Typically, the atmosphere also comprises elements like xenon (Xe) and/or argon (Ar). In a practical example, where the overall pressure inside the discharge vessel 2 is in the order of 1-2 atm, argon and xenon may be present in the ratio 1:1. In another practical example, where the overall pressure is in the order of 10-20 atm, the discharge chamber may contain mercury and a relatively small amount of argon. In the following, those examples of commercially available lamps will be indicated as relatively low pressure lamp and relatively high pressure lamp, respectively.

The discharge vessel 2 also contains one or more metal-halide substances. Although these may comprise bromides or other halides, these substances typically comprise iodides. Typical examples of such possible substances are lithium iodide, cerium iodide, sodium iodide. Other substances are possible, too.

The metal halides are provided as a saturated system comprising an excess amount of salt, such that during operation of the lamp a salt pool of melted salt will be present inside the discharge chamber 5. In the following, it will be assumed that the salt pool is located at the lowest location inside the discharge chamber 5.

In operation, a discharge will extend between the electrodes 6, 7. Due to the high temperature of the discharge, said substances will be ionized and will produce light. The color of the light produced is different for different substances; for instance, the light produced by sodium iodide is red while the light produced by cerium iodide is green. Typically, the lamp will contain a mixture of suitable substances, and the composition of this mixture, i.e. the identity of said substances as well as their mutual ratio, will be chosen such as to obtain a specific desired overall color.

Figure 2:
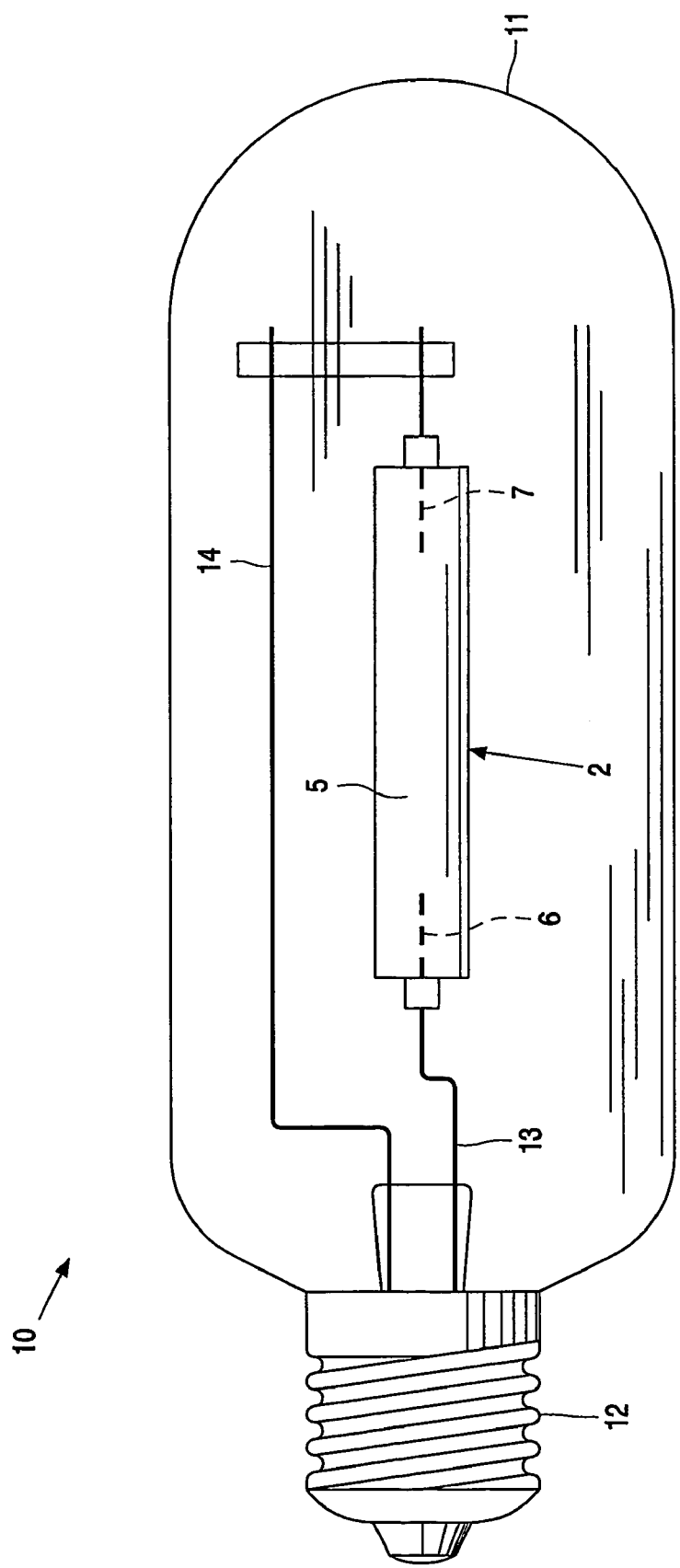

FIG. 2 shows the lamp 1 mounted in a bulb or envelope 11 having at one end thereof a standard lamp connection cap 12, suitable for screwing into a standard lamp fitting (not shown). The lamp 1 is axially aligned with the bulb 11. The lamp 1 is supported by two supportive conductors 13 and 14, suitably connected to the electrode conductors 8 and 9, respectively, and electrically connected to electrical contacts of the cap 12.

The combination of lamp 1 and its surrounding bulb 11 will be indicated hereinafter as lamp assembly 10.

Figure 3:
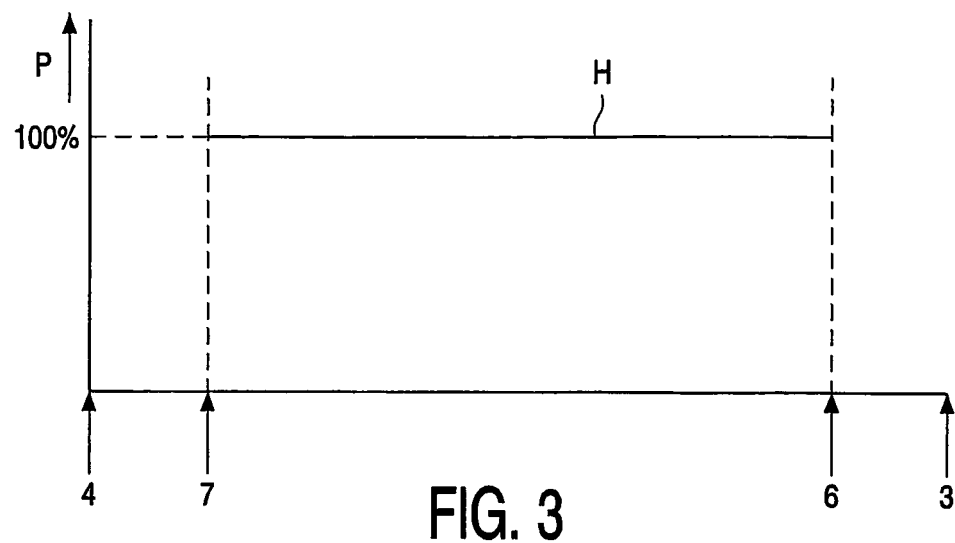
FIG. 3 is a graph illustrating the particle distribution along the central axis of a lamp in its horizontal orientation.

FIG. 2 illustrates the lamp assembly 10 in a horizontal orientation, i.e. the central axis of the discharge vessel 2 is positioned horizontally. In this orientation, a discharge arc between the electrodes 6 and 7 will have its arc axis directed horizontally. In this orientation, the spatial distribution of particles inside the discharge vessel 2, along the central axis thereof, will be substantially homogeneous, as illustrated by the horizontal line H in FIG. 3. FIG. 3 is a graph illustrating the partial particle pressure or particle concentration as function of the location along the central axis of the discharge vessel 2. This location is represented by the horizontal axis of FIG. 3 where, by way of reference, the position of end caps 3 and 4 and electrodes 6 and 7 are indicated. The graph relates only to the space between the electrodes 6 and 7, i.e. the location of the arc.

Although in practice the composition of the mixture of the ionizable components may vary such that the partial pressure of each individual ionizable component will have a different value, this is not represented in FIG. 3. It is noted that, for the present discussion, the exact value of the partial component pressure is not relevant, therefore the vertical axis of FIG. 3 does not show any scale marks. Only at the level of the said horizontal line H, the value 100% is marked. This value corresponds to the "maximum" value a partial component pressure reaches along the lamp axis. Thus, since all partial component pressures are substantially constant (and therefore equal to maximum) along the lamp axis, all mutually different partial pressures are represented in FIG. 3 by only one horizontal line H.

It is important to realize that the light-emitting properties of the lamp 1 at a certain location in the lamp depend on the partial pressure of the ionizable components at that certain location. The higher the partial pressure of a specific component at said certain location, the more light will be produced having the specific spectral properties corresponding to this specific component. Thus, if the partial pressure of the components along the central axis of the lamp is constant, as illustrated by line H in FIG. 3, also the light-emissive properties of the lamp 1 as a whole are constant along the central axis of the lamp 1, i.e. constant light intensity and constant color.

Figure 4:
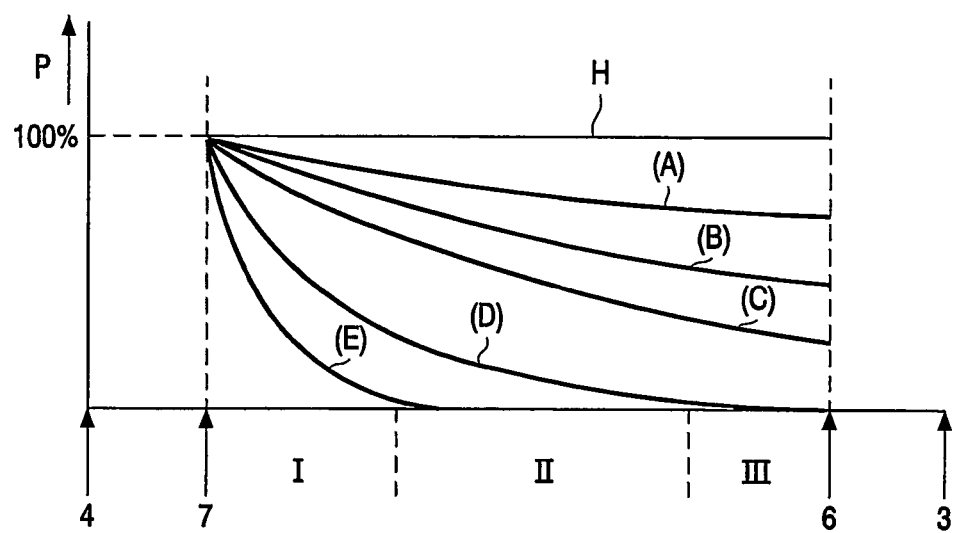
FIG. 4 is a graph illustrating the particle distribution along the central axis of a lamp in its vertical orientation.

FIG. 4 illustrates the problems of segregation associated with a vertical orientation of the lamp 1. FIG. 4 is comparable to FIG. 3, and by way of reference the horizontal line H corresponding to the horizontal orientation of the lamp 1 is shown as well. Otherwise, FIG. 4 relates to a vertical orientation of the lamp 1, where a burning arc will have its arc axis directed vertically. In the example shown, it is assumed that second electrode 7 is the lower electrode while first electrode 6 is the upper electrode, corresponding to the illustration of FIG. 1. Curves (A)-(E) show that in this condition the partial particle pressure is not constant but depends on the location. More particularly, the partial particle pressure decreases with increasing vertical distance from the bottom electrode 7. This phenomenon is a natural phenomenon, caused by a combination of convection and diffusion occurring within the discharge chamber 5, as will be clear to a person skilled in the art.

The effect of segregation may be more or less severe, depending on circumstances. As a general rule, the effect is increasingly severe with increasing pressure in the discharge chamber 5. For instance, curve (A) might relate to a relatively low pressure situation in the order of 1-2 atm, while curve (E) might relate to a relatively high pressure situation in the order of 10-20 atm.

Further, the effects of segregation tend to be most noticeable at one end of the lamp (the upper end in the example shown). Close to the lower electrode 7, the particle concentrations are virtually "normal" in this example, i.e. identical to the horizontal condition, illustrated by the fact that, at the location of lower electrode 7, all curves intersect each other at the horizontal line H. At other locations, the particle concentrations deviate from their value close to the lower electrode 7, the deviation increasing with increasing distance from the lower electrode 7, ending at a maximum deviation close to the upper electrode 6. As a general rule, the effect is increasingly severe with increasing length Li of the discharge chamber 5.

Further, the severity of segregation is not equal for different elements within the same lamp. For instance, the segregation in the case of cerium iodide is more severe than the segregation in the case of sodium iodide, so that curve (B) might be representing cerium iodide while curve (A) might be representing sodium iodide. However, this does not necessarily mean that the partial pressure of sodium iodide is always higher than the partial pressure of cerium iodide.

Segregation affects the efficacy of the lamp 1, since the amount of light produced within a certain unit of space is proportional to the amount of light generating particles within such unit of space, as will be clear to a person skilled in the art. Thus, segregation causes a reduction of light output of the lamp as a whole. Also, segregation causes an uneven distribution of the light intensity along the length of the lamp; more particularly, the higher portions of the lamp will produce less light than the lower portions of the lamp.

The above already applies if a lamp contains only one light generating substance. In the case of a mixture of substances, the above applies also, but to a different extent for the various components in the mixture, as explained earlier. Since the overall color impression of the light produced by the lamp depends on the light contributions from the various components of the mixture, segregation causes a change of the color of the light produced by the lamp as a whole on the one hand, and on the other hand segregation causes an uneven color distribution along the length of the lamp.

This effect will be most noticeable at the upper extremity of the lamp 1, while the situation at the lower extremity of the lamp seems normal. As indicated in FIG. 4, at the lower electrode 7 the relative partial pressures of the light-producing components is substantially corresponding to the situation of horizontal orientation, and the generated light is in conformity with design expectations. In contrast, at the upper electrode 6, the relative partial pressures deviate from the situation of horizontal orientation, the extent of deviation being different for different components. For instance, in the case of a lamp containing a mixture of sodium iodide and cerium iodide in a predetermined ratio, the amount of reddish light (for instance: curve A) produced by the sodium iodide will, at the upper electrode 6, be reduced because of the reduced concentration of sodium atoms near the upper electrode 6 while also the amount of greenish light (for instance: curve B) produced by the cerium iodide will be reduced because of the reduced concentration of cerium atoms. Since, at the upper electrode 6, the intensity of reddish light as well as the intensity of greenish light will have been reduced, the overall light intensity around the upper electrode 6 will have been reduced. Since the reduction of greenish light is more than the reduction of reddish light, the overall impression of the color of the light produced around the upper electrode 6 will have shifted to reddish.

Curves (D) and (E) show that the segregation can be severe to such extent that a certain amount of space around the upper electrode 6 is virtually void of any light-producing ions. What remains is a background glow produced by the mercury buffer gas.

The present invention is based on the recognition that an electrical field causes ion transport, and as a consequence also a transport of atoms of the same element in the opposite direction. This can be schematically illustrated as follows. Consider two electrodes 56 and 57 located vertically above each other, the upper electrode 56 being charged negatively with respect to the lower electrode 57, as schematically illustrated in FIG. 5. An electrical field between these electrodes is indicated by arrows E. A positively charged particle P+ will feel a force pulling it towards the negatively charged upper electrode 56. In an equilibrium state, a cloud 58 of positively charged particles will have formed near the upper electrode 56, effectively shielding the negative charge of the upper electrode 56 thus reducing the electrical field E.

The above already applies in the case of a direct current. In the case of an alternating current, or a "constant" current having alternating current direction, charged particles are transported towards one electrode during the first part of the current period, and are transported towards the other electrode during the second part of the current period. The charged particles also feel forces originating from convection and/or gravity, and forces caused by the cloud of charges in the lamp.

The present invention manipulates the light (amount and/or color temperature) produced by a metal-halide lamp by manipulating the particle distribution in the discharge chamber. Specifically, according to an embodiment of the present invention, a lamp current is generated with a duty cycle differing from 50% and a current ratio differing from 1, selected such that, on average, the DC component of the current has a zero value. Here, as will be explained in more detail, the current ratio is defined as the ratio between positive current magnitude and negative current magnitude. Changing the duty cycle and the current ratio in combination while maintaining the DC component of the current at zero will, depending on lamp type, result in a change of particle distribution, and hence a change of color temperature and/or efficacy.

The following describes possible embodiments of driver devices according to the invention. FIG. 6 is a block diagram schematically illustrating a driver device or electronic ballast 60 for driving a lamp 1. An electronic ballast or driver 60 typically comprises an input 61 for receiving AC mains, a rectifier 62 for rectifying the AC mains voltage, a DC/DC up converter 63 for converting the rectified mains voltage to a higher constant voltage, a down converter 64 for converting said higher constant voltage to a lower constant voltage (lamp voltage) and a corresponding constant current (lamp current), and a commutator 65 for regularly changing the direction of this DC current and the polarity of the DC voltage within a very brief time (commutating periods).

Conventionally, a driver is designed such that its output may be considered as constituting a current source with alternating current direction but constant current magnitude, having a duty cycle of 50%, i.e. the current has one direction during 50% of the current period and has opposite direction during the remainder of the current period. Thus, each lamp electrode is operated as cathode during 50% of each current period and is operated as anode during the other 50% of each current period, and the average current $I_{AV}$ is equal to zero. FIG. 7A is a graph showing the lamp current $I_L$ as a function of time, illustrating this square wave current operation. It is clearly shown that the magnitude of the lamp current remains substantially constant ($I_{NOM}$), but the direction of the current is changed on a regular basis, indicated as a change of the sign of the current from positive to negative and vice versa.

In the following, a current having one direction will be indicated as "positive" current $I_P$, while a current having the opposite direction will be indicated as "negative" current $I_N$, it being arbitrary which current direction is associated with the indication "positive".

Further, the current intensity of the "positive" current $I_P$ will be indicated as "positive" intensity $|I_P|$, while the current intensity of the "negative" current will be indicated as "negative" intensity $|I_N|$. A current ratio R will be defined as $R=|I_P|/|I_N|$; for square wave current operation, R=1.

Further, the duration of the "positive" current $I_P$ will be indicated as "positive" duration $\tau_P$, while the duration of the "negative" current $I_N$ will be indicated as "negative" duration $\tau_N$. The current period $t=\tau_P+\tau_N$. The duty cycle D will be defined as $D=\tau_P/t$; for square wave current operation, D=50%

FIG. 7B is a graph illustrating one possibility for changing the color temperature. In this case, the positive intensity $|I_P|$ differs from the negative intensity $|I_N|$, while the current has a duty cycle of 50%. Thus, R≠1 and D=50%. It will be seen that the average current $I_{AV}$ differs from zero, indicated by a dashed line. Since the current intensity is proportional to the number of particles transported per unit time, more particles will be transported during the positive current than during the negative current, so that, on average, a particle transport proportional to the average current $I_{AV}$ will result. This mechanism for particle transport will hereinafter be indicated by the phrase "current ratio mechanism".

FIG. 7C is a graph illustrating a second possibility for changing the color temperature. In this case, the positive intensity $|I_P|$ is equal to the negative intensity $|I_N|$, while the current has a duty cycle differing from 50%. Thus, R=1 and D≠50%. It will be seen that the average current $I_{AV}$ differs from zero, indicated by a dashed line $I_{AV}$. In both the positive half and the negative half of the duty cycle, the number of particles transported per unit time will be the same, but, since the positive duration $\tau_P$ is longer than the negative duration $\tau_N$, more particles will be transported during the positive half of the duty cycle than during the negative half of the duty cycle, so that, on average, a particle transport proportional to the average current $I_{AV}$ will result. This mechanism for particle transport will hereinafter be indicated by the phrase "duty cycle mechanism".

As will be demonstrated in the following, the resulting shift of the particle distribution is not the same for the current ratio mechanism and the duty cycle mechanism. A possible explanation may be found in the fact that the lamp voltage is substantially independent from the lamp current. Thus, in the case of the current ratio mechanism, when the duty cycle is equal to 50%, the average lamp voltage will be substantially equal to zero. On the other hand, in the case of the duty cycle mechanism, the average lamp voltage will differ from zero, proportional to the duty cycle, resulting in a net force on the charged particles cloud.

The present invention proposes to change both the duty cycle D and the current ratio R in such a way that the average current is maintained at zero. This is illustrated in FIG. 10 showing a graph illustrating an example of a lamp current according to the invention. In this example:

the current period is 10 ms (100 Hz);
the positive current duration $\tau_P$ is equal to 4 ms;
the negative current duration $\tau_N$ is equal to 6 ms;
the positive current intensity $|I_P|$ is equal to 528 mA;
the negative current intensity $|I_N|$ is equal to 352 mA.

Thus, the current ratio $R=|I_P|/|I_N|$ is equal to 1.5, while also the ratio $\tau_N/\tau_P$ is equal to 1.5. It can easily be seen that the average current $I_{AV}$ is equal to zero in such case, according to the formula:

$$I_{AV} = \frac{|I_P| \cdot \tau_P - |I_N| \cdot \tau_N}{\tau_P + \tau_N} \quad (1)$$

Experiment 1

In a first experiment, one experimental HID lamp was driven at a lamp power of approximately 75 W, at a lamp current having a commutating frequency of 100 Hz. The duty cycle was set at D=50%, the current ratio was set at R=1, so the average current $I_{AV}$ was zero and the average lamp voltage was approximately zero. The lamp rms-voltage was about 170 V, the lamp rms-current was about 440 mA. The color temperature of the light was measured; it appeared to be approximately 2750 K. This result is shown as mark 181 in FIG. 8, which is a graph showing color temperature (vertical axis) as a function of average lamp current (horizontal axis). Also, the lamp efficacy was measured; it appeared to be approximately 83 lm/W. This result is shown as mark 191 in FIG. 9, which is a graph showing efficacy (vertical axis) as a function of average lamp current (horizontal axis).

Experiment 2

In a second experiment, using the same lamp, keeping the duty cycle constant at D=50% and the average lamp voltage at zero, the current ratio was changed to obtain a DC shift of the average lamp current $I_{AV}$. The color temperature of the light was measured in relation to the average lamp current $I_{AV}$; the results are plotted as curve 182 in FIG. 8. Further, the efficacy was measured in relation to the average lamp current $I_{AV}$; the results are plotted as curve 192 in FIG. 9. At a current ratio R≈2.6 ($|I_P|$=706 mA, $|I_N|$=270 mA), a color temperature of about 3930 K and an efficacy of about 66 lm/W were achieved at an average lamp current $|I_{AV}|$≈218 mA; in this case, the lamp rms-voltage had risen to about 180 V, and the lamp rms-current had risen to about 490 mA.

Experiment 3

In a third experiment, using the same lamp, keeping the magnitude of the lamp current substantially constant at 440 mA and the magnitude of the lamp voltage substantially constant at 170 V, the duty cycle was changed to obtain a DC shift of the average lamp current $I_{AV}$ and a shift of the average lamp voltage. The color temperature of the light was measured in relation to the average lamp current $I_{AV}$; the results are plotted as curve 183 in FIG. 8. Further, the efficacy was measured in relation to the average lamp current $I_{AV}$; the results are plotted as curve 193 in FIG. 9. A color temperature of about 4250 K and an efficacy of about 65 lm/W were achieved at an average lamp current $|I_{AV}| \approx 96$ mA; in this case, the lamp rms-voltage had risen to about 175 V, the lamp rms-current had dropped to about 430 mA, and the average lamp voltage had risen to about 40 V.

It is noted that the following relationships apply:

$$|I_{AV}| = |1 - 2\delta| \cdot |I_{rms}| \text{ and } |V_{AV}| 1 - 2\delta| \cdot |V_{rms}|$$

with $\delta = \tau_1 / (\tau_1 + \tau_2)$

When comparing the results of the above experiments, it can clearly be seen that, in order to obtain a change in color temperature or to obtain a change in efficacy, changing the average current by changing the duty cycle D is much more efficient than changing the average current by changing the current ratio R. For instance, changing the average current from zero to −90 mA by changing the current ratio from 1 to 0.66 will result in a change in color temperature from 2750 K to about 3200 K, i.e. a change of +450 K, whereas changing the average current from zero to −90 mA by changing the duty cycle D from 50% to about 40% will result in a change in color temperature from 2750 K to about 4100 K, i.e. a change of +1350 K. This may be explained by the different mechanisms involved to obtain color variation ("duty cycle mechanism" and "current ratio mechanism").

Experiment 4

In a fourth experiment, using the same lamp, keeping the average lamp current $I_{AV}$ at zero, the duty cycle and the current ratio where changed. The color temperature of the light was measured in relation to the duty cycle D; the results are plotted as curve 184 in FIG. 11. Further, the efficacy was measured in relation to the duty cycle D; the results are plotted as curve 194 in FIG. 12. These curves clearly demonstrate that it is possible to change lamp characteristics while keeping the average lamp current $I_{AV}$ at zero.

It is noted that the quantitative effect achieved, for instance which color temperature is reached at which duty cycle, may depend on, for instance, lamp type and operating conditions such as current intensity.

In the present experiment, at least one advantage is obtained when comparing the results of FIGS. 11 and 12 with the results of FIGS. 8 and 9. When the color temperature is used as reference feature, the corresponding efficacy is higher in the case of experiment 4.

FIG. 13 is a schematic block diagram of an electronic lamp driver 160 adapted to execute lamp control in accordance with the present invention. The driver comprises a controller 150, which has an input 151 for receiving a user command $S_U$ from a user input device 152; in an exemplary embodiment, the user input device 152 may be a potentiometer. The controller 150 has a first control output 155 coupled to the commutator 65 for setting the duty cycle of the commutator 65. The controller 150 further has a second control output 154 coupled to the down converter 64, for controlling the lamp current intensity. The controller 150 is designed to adapt its control signals $S_D$, $S_I$ such that the average lamp current $I_{AV}$ is maintained at zero. It is noted that, if desired, it is possible that the controller 150 is designed to adapt its control signals such that the average lamp current is maintained at a constant level differing from zero.

In one embodiment, the controller 150 may be associated with a lamp current sensor 159, for instance a resistor coupled in series with the lamp, providing a measuring signal $S_L$ indicating the actual or average lamp current, which measuring signal $S_L$ is received by the controller 150 at a current sensor input 158, thus providing a current feedback loop. In response to receiving a user command $S_U$, the controller 150 may change the setting of its first control signal $S_D$ to change the setting of the duty cycle D, and may change its second control signal $S_I$ in response to the measuring signal $S_L$ in order to keep the average lamp current $I_{AV}$ at a constant level. Alternatively, in response to receiving a user command $S_U$, the controller 150 may change the setting of its second control signal $S_I$ to change the setting of the current ratio R, and may change its first control signal $S_D$ in response to the measuring signal $S_L$ in order to keep the average lamp current $I_{AV}$ at a constant level.

In another embodiment, the controller may be associated with a memory 156, which contains information, for instance in the form of a table, for instance comprising a relationship between the duty cycle D and the current ratio R, or for instance comprising a relationship between an input signal on the one hand and settings of the first control signal $S_D$ and the second control signal $S_I$ on the other hand. This information may be predetermined information, provided by the manufacturer. In response to receiving a user command $S_U$, the controller 150 may change the setting of its first control signal $S_D$ to change the setting of the duty cycle D, and may change its second control signal $S_I$ correspondingly, based on the information in said memory 156. Alternatively, in response to receiving a user command $S_U$, the controller 150 may change the setting of its second control signal $S_I$ to change the setting of the current ratio R, and may change its first control signal $S_D$ correspondingly, based on the information in said memory 156. Or, in response to receiving a user command $S_U$, the controller 150 may change the setting of its second control signal $S_I$ and the setting of its first control signal $S_D$ simultaneously, based on the information in said memory 156.

In one aspect, the present invention is aimed at the problem of segregation affecting the properties of a lamp, intended for horizontal operation, when mounted in a vertical orientation, leading to a reduced efficacy, such as typically occurring in a low pressure lamp (1-2 atm). According to this aspect of the present invention, means are now provided which allow a reduction of segregation and hence an improvement of efficacy. It is even possible to provide a lamp system wherein the efficacy of the lamp can be controlled as desired, and can be set to a certain predetermined value, even in different lamp orientations. It is even possible to provide a lamp system wherein the efficacy is automatically kept constant, independent of lamp orientation.

It is noted here that a metal-halide lamp contains, during operation, a salt pool at a certain location inside the lamp. This salt pool is subjected to two flows of particles: inflow of particles entering the pool, and outflow of particles leaving the pool. In steady state, the inflow and the outflow are balanced. If the duty cycle D and the current ratio R of the lamp current are changed, the inflow or the outflow is influenced, depending on the magnitude and direction of the current component in each part of the duty cycle. In steady state, a new balance between inflow and outflow will have established, associated with a new particle distribution within the lamp.

The combination of duty cycle D and current ratio R may deliberately be chosen such as to increase segregation; in that case, the balance has shifted such that more particles have entered the salt pool. However, in a specific implementation of the present invention, the combination of duty cycle D and current ratio R is chosen such as to effectively eliminate or at least reduce the segregation effects discussed above. To this effect, the ion flow must be directed away from the salt pool in order to compensate segregation. In this case, the upper electrode 6 should, on average, be negative with respect to the lower electrode 7.

Further, for one specific lamp specimen, there will be one specific optimum electrical field corresponding to one specific optimum duty cycle. This optimum duty cycle will be substantially the same for different lamps of the same type, and this optimum value can be determined experimentally by the manufacturer. Thus, it is possible to provide a driving apparatus 160 with a mode selection switch 167 having three positions U, H, D, corresponding for operating a lamp 1 in a HORIZONTAL position (H) or in a vertical position (U, D) respectively corresponding to a specific electrode (for instance first electrode 6) being UP (U) or DOWN (D).

If the lamp 1 is mounted in a vertical orientation, the user may set the mode selection switch 167 to either its U-position or its D-position, depending on which electrode is up and which is down. Usually, this will correspond to the lamp bulb 11 being mounted with the cap 12 downwards (lamp bulb "standing") or with the cap 12 upwards (lamp bulb "hanging"). The driver 160 is responsive to this selection by generating a predetermined optimum combination of duty cycle D (D≠50%) and current ratio R (R≠1).

If the lamp is symmetrical, the segregation in the case of a standing bulb is identical to the segregation in the case of a hanging bulb, and then the current settings for the correction in the up orientation can be comparable to the current settings for the down orientation. If the lamp is not symmetrical, those two current settings may differ from each other.

Let the duration of the periods during which a certain electrode (7; 6) is positive with respect to the other electrode (6; 7) be indicated as ($T_7$; $T_6$), respectively; then, the total current period $T_T = T_7 + T_6$. Now a duty cycle $D_u$ (corresponding to the case of the mode selection switch 167 being in its U-position) can be defined as the ratio $T_7/T_T$, while a duty cycle $D_D$ (corresponding to the case of the mode selection switch 167 being in its D-position) can be defined as the ratio $T_6/T_T$. In the case of a symmetrical lamp, $D_D = 1 - D_U$.

In the embodiment described above, the mode selection switch 167 is user-controllable. However; the present invention also provides, in a preferred embodiment, a system for generating light by means of a metal-halide lamp, wherein optimum operative conditions comparable to horizontal operation are set automatically, adapted to the actual lamp orientation. This means that the user is not limited by a certain prescribed lamp orientation, but also the user does not need to select an optimum operative condition for the lamp driver: whichever orientation the user desires to arrange the lamp, the driver is automatically adapted to operate in an optimum mode.

Such system 170 is illustrated in FIG. 14. This system 170 comprises a lamp driver or ballast 160 as described above with reference to FIG. 13, without, however, the user-controllable mode selection switch 167. The system 170 further comprises a fitting 168 for receiving the lamp cap 12 of the lamp assembly 10, the fitting 168 having contacts connected to output terminals of the commutator 65, as known per se.

The system 170 further comprises a position detector 80 for detecting the actual orientation of the lamp 1, and for providing the controller 150 with a control signal S indicative of such orientation, whereas the lamp driver 160 is adapted to drive the lamp according to the optimum operative conditions corresponding to the actual lamp orientation as sensed by the orientation detector. In this respect, the responsiveness of the driver 160 is the same as described above, as will be clear to a person skilled in the art.

In principle, any detector suitable for generating a detectable signal indicative of an orientation can be used. FIG. 15 illustrates a possible embodiment of such orientation detector. In this embodiment, the orientation detector 80 comprises a cylindrical container 81, for instance made from glass, with a central portion having a larger diameter groove 82. The container 81 is sealed and contains a small amount of an electrically conductive liquid 83, for instance mercury. A first pair of contact electrodes 84 is arranged inside the container 81 near a first axial end thereof, connected to a first set of conductors 85 extending through the wall of the container 81. Similarly, a second pair of electrodes 86 is arranged at the opposite axial end, associated with a second set of conductors 87. A set of two annular electrodes 88 is arranged in the said groove, connected to a third set of conductors 89 extending through the wall of the container 81.

In FIG. 15, the detector 80 is shown in a horizontal orientation. The conductive liquid 83 has moved to the lowermost location inside the container 81, which in this case is the said groove 82, and contacts both central electrodes 88. Thus, an electrically conductive path is formed between the two corresponding conductors 89. Similarly, if the detector 80 is placed in an upright orientation, the conductive liquid 83 contacts the electrodes 84; 86 on either axial end of the cylinder.

Said conductors 85, 87, 89 are coupled to the controller 150 of the driver 160; thus, the controller 156 receives the detector output signals, and the controller 150 knows the orientation of the lamp 1 and drives the lamp accordingly.

The orientation detector 80 may be arranged within the bulb 11 of the lamp assembly 10. However, then it is necessary to provide for contacts in the lamp cap 12 for guiding the sensor signals towards the driver. Preferably, therefore, the sensor is associated with the said fitting 68 for the lamp assembly 10, such fitting necessarily always having the same orientation as the lamp fitted therein. Then, a fixed connection between sensor and driver is possible.

As explained above, due to the fact that the duty cycle D differs from 50% and that the current ratio R differs from 1, an ion flow will be caused, directed away from the salt pool. The higher the difference between D and 50%, the stronger the ion flow. On the other hand, the salt pool is maintained by a reflow of atoms. Preferably, the difference between D and 50% should not be selected too large, because then the salt pool can be displaced to a different location and segregation can be stimulated.

In another aspect, the invention aims to provide a lamp system with variable color properties. A driver preferred for such implementation is illustrated in FIG. 13, with the understanding that the user-controllable mode selection switch 167 is omitted. The input device 152, such as for instance a potentiometer, generates a control signal, which can be varied continuously within a predetermined range. The input device 152 can be user-controllable, but it can also be a suitably programmed controller.

Again, the driver 160 produces a commutating current of which the duty cycle D and the current ratio R can be varied, either directly by a user or by a suitably programmed controller, such as to change the amount of segregation as desired. In principle, the duty cycle D can be varied from 0 to 100%. Herein, the upper electrode 6 can be made negative with respect to the lower electrode 7 in order to reduce segregation to a desired extent, as described above, but the upper electrode 6 can also be made positive with respect to the lower electrode 7 in order to increase segregation and enhance the color separation effect or color changing effect.

In this respect it is noted that, in the case of a metal-halide lamp with a relatively high pressure in the order of 10-20 atm, changing the duty cycle in combination with the current ratio has surprisingly appeared to have a great influence on the color of the produced light.

With such a system, it has appeared possible to control a lamp such that a well-defined line is traveled in the standard XY-color or chromaticity diagram. With the composition of the salt mixture, a certain zero color point in this diagram can be selected. By varying the combination of duty cycle and current ratio of the commutating current whilst keeping the average current constant, preferably zero, the color point of the lamp shifts along a line intersecting said zero color point. The angle of this line depends, inter alia, on the overall lamp pressure and the amount of mercury in the lamp: in the case of a low pressure lamp (i.e. overall lamp pressure lower than about 3 atm), said line will substantially be parallel to color isotherms, whereas in the case of a high pressure lamp (i.e. overall lamp pressure higher than about 10 atm), said line will substantially be perpendicular to color isotherms, which involves a large variation in color temperature.

This aspect of the invention can be practiced in a vertical lamp orientation as well as in a horizontal lamp orientation. As explained above, segregation will occur if a metal-halide lamp is mounted vertically, and this segregation can be reduced or increased by applying a duty cycle different from 50% in combination with a current ratio differing from 1. The important feature in this respect is that it is possible to change the particle distribution instantaneously by changing the duty cycle in combination with the current ratio whilst keeping the average current constant. This feature is not restricted to vertical lamp orientation.

In a horizontal lamp orientation, a salt pool will have formed at a certain location, which, in the case of a symmetrical, long, thin lamp, typically is one end or both ends of the lamp. As explained earlier, there is balance between inflow and outflow of particles into and out of the salt pool, corresponding to a certain particle distribution inside the lamp. According to the invention, it is possible to shift this particle distribution by changing the duty cycle in combination with the current ratio whilst keeping the average current constant. This phenomenon will also be termed "duty cycle induced distribution shift".

In order to obtain a defined initial situation, it is possible to operate the lamp at DC current (e.g. duty cycle 0%). Then, after some time, the salt pool will be located at one of the two ends of the lamp; segregation is now at a maximum.

From this starting situation, the segregation can be reduced by raising the duty cycle from 0% while simultaneously changing the duty cycle. With increasing duty cycle, a new balance will establish between inflow and outflow, the salt pool initially staying substantially in place. The segregation can be eliminated by raising the duty cycle to almost 50%. A duty cycle of more than 50% leads to an undesired transportation of salt.

The duty cycle range between 0% and 50% determines the color range of the lamp, attainable by this aspect of the present invention. When the duty cycle is 0%, the light produced by the lamp can be represented by a certain color point in the chromaticity diagram. The exact location of this color point, which will also be termed "horizontal zero" color point, depends on the composition of the mixture of elements within the lamp, and can be selected by suitably selecting this composition, as will be clear to a person skilled in the art. If the duty cycle is increased, the color point will shift away from the horizontal zero color point. An end point is reached when the duty cycle reaches 50%. Thus, the color point will travel a line, hereinafter termed "color line", which has one end point defined by the horizontal zero color point and an opposite end point defined by 50% duty cycle. This involves a change of the color temperature in the order of between 1500 K and 2000 K.

If the initial situation is reversed, i.e. by initially setting the duty cycle to 100%, changing the duty cycle from 100% to 50% will yield substantially the same results.

Thus, for a high-pressure lamp (10-20 atm), it has appeared possible to vary the color temperature over a range in the order of 1500-2000 K.

In the case of a lamp with an asymmetric geometry, the salt pool will have a preferred location, i.e. the coldest place in the lamp, which is typically one end of the lamp. Assume this preferred location corresponds to the initial position obtained by setting a duty cycle of 0%. It is now possible to increase the duty cycle above 50%, to a limited extent, before transportation of salt occurs. Hence, the color temperature variation range will be larger.

This range is even wider (2500-3000) K in the case of vertical lamp orientation, due to the fact that in such case the salt pool will typically be located at one end of the lamp, i.e. the coldest spot of the lamp, typically the lower end. In this case, when the same lamp as discussed is turned from a horizontal orientation to a vertical orientation, while the average DC current is kept zero, segregation may occur and the color temperature may shift. This shift will depend on the composition of the mixture of elements within the lamp, and on the amount of segregation. Again, the light produced by the lamp can be represented by a color point in the chromaticity diagram, which will now be termed "vertical zero" color point.

If the combination of duty cycle and current ratio is varied, the segregation will be increased or decreased, depending on the orientation of the lamp, while in both cases the color point will shift.

In the case of a vertically burning lamp, the discharge is asymmetric due to convection. Typically, the temperature at the upper end of the lamp is higher than the temperature at the lower end of the lamp. Therefore, the partial pressures of the salt components can be higher than the partial pressures just above the salt pool before condensation occurs. Due to this, and to the fact that this effect does not occur to an equal extent for all salt components, the range from no segregation to maximum segregation can correspond to an additional variation in color temperature, and the maximum color temperature variation can be larger than in the case when the lamp is mounted horizontally.

Thus, for a high-pressure lamp (10-20 atm) mounted vertically, it has appeared possible to obtain a color temperature variation of about 2500 to 3000 K.

With such a system, it has also appeared possible to provide a multi-color lamp. To explain this, reference is once again made to FIG. 4. As explained earlier, the severity of segregation can be different for different substances, and the same applies for the enhanced segregation as caused by a light controlling combination of duty cycle and current ratio in accordance with the invention. Assume that curves (A) and (B) represent sodium iodide and cerium iodide, respectively, for a lamp operated with a square wave. Assume that curves (C) and (D) represent sodium iodide and cerium iodide, respectively, for the same lamp now operated with a combination of duty cycle and current ratio selected such as to enhance the segregation. Then, the lamp will show three bands of light. In the lowest region I of the lamp, the color of the light will be close to "normal" white light, although shifted to reddish. In a second region II of the lamp, above the first region, cerium iodide is almost completely absent, and the emitted light does not have any green contribution from cerium iodide any more: the color of the light is now completely determined by sodium iodide, i.e. red. In a third region III of the lamp, above the second region, also the sodium iodide is almost completely absent, and the emitted light does not have any red contribution from sodium iodide any more; if the lamp does not contain any other salts, this third region will emit a blue-like glow from the mercury buffer gas. If the lamp does have a third salt component with less segregation, the light generated by this third component will dominate.

Thus, a very colorful effect of multiple bands with different colors is possible.

It should be clear to a person skilled in the art that the present invention is not limited to the exemplary embodiments discussed above, but that several variations and modifications are possible within the protective scope of the invention as defined in the appending claims.

In the above, the present invention has been explained with reference to block diagrams, which illustrate functional blocks of the device according to the present invention. It is to be understood that one or more of these functional blocks may be implemented in hardware, where the function of such functional block is performed by individual hardware components, but it is also possible that one or more of these functional blocks are implemented in software, so that the function of such functional block is performed by one or more program lines of a computer program or a programmable device such as a microprocessor, microcontroller, digital signal processor, etc.

Further, it is noted that the lamp current control as proposed by the present invention can easily be implemented by an appropriate software or hardware adaptation in existing lamp drivers.

The invention claimed is:

1. A method for driving a gas discharge lamp with an alternating current, the method comprising:
   determining an orientation of the gas discharge lamp;
   generating a lamp current ($I_P$) with a positive current intensity ($|I_P|$) for a positive duration ($\tau_P$);
   changing the direction of the lamp current; and
   generating a lamp current ($I_N$) with a negative current intensity ($|I_N|$) for a negative duration ($\tau_N$);
   wherein the lamp current has a duty cycle ($D=\tau_P/(\tau_P+\tau_N)$),
   wherein the lamp current has a current ratio ($R=|I_P|/|I_N|$), and
   wherein the duty cycle (D) and the current ratio (R) are adjusted based upon the determined orientation of the gas discharge lamp.

2. The method of claim 1, wherein an average lamp current ($I_{AV}$) is maintained to be substantially equal to zero.

3. The method of claim 1, wherein an average lamp current ($I_{AV}$) is maintained at a constant value.

4. The method of claim 3, wherein the duty cycle (D) is changed in response to a user command, wherein the average current ($I_{AV}$) is measured, and wherein the current ratio (R) is changed in order to effectively maintain the average current ($I_{AV}$) at its constant value.

5. The method of claim 3, wherein the current ratio (R) is changed in response to a user command, wherein the average current ($I_{AV}$) is measured, and wherein the duty cycle (D) is changed in order to effectively maintain the average current ($I_{AV}$) at its constant value.

6. The method of claim 3, wherein, in response to a user command, the current ratio (R) and the duty cycle (D) are changed in combination to maintain a predetermined relationship between the current ratio (R) and the duty cycle (D).

7. The method of claim 3, wherein, the average current ($I_{AV}$) is measured, and in response to the measured average current ($I_{AV}$), the current ratio (R) and the duty cycle (D) are adjusted to match values corresponding to the measured average current ($I_{AV}$) that are stored in a memory.

8. The method of claim 1, wherein the duty cycle (D) and the current ratio (R) are adjusted substantially simultaneously.

9. A driver for driving a gas discharge lamp, the driver being configured to perform the method of claim 1.

10. The method of claim 1, wherein the duty cycle (D) is adjusted to differ from 50% and the current ratio (R) is adjusted to differ from 1.

11. A device for driving a gas discharge lamp, comprising:
    current generator configured to generate a current; and
    a commutator adapted to receive the current and to commutate the current to generate a commutating current having a duty cycle (D) and a current ratio (R) of a magnitude of the commutating current during a positive cycle to a magnitude of the commutating current during a negative cycle, and having an output configured to be connected to the gas discharge lamp,
    wherein at least one of the duty cycle (D) and the current ratio (R) are adjusted based upon a control signal indicating an orientation of the gas discharge lamp.

12. A method for driving a gas discharge lamp supplied with a commutating current, comprising:
    setting a duty cycle (D) of the commutating current; and
    setting a current ratio (R) of a magnitude of the commutating current during a positive cycle to a magnitude of the commutating current during a negative cycle,
    wherein the duty cycle (D) and the current ratio (R) are set based upon the orientation of the gas discharge lamp so as to maintain a desired particle distribution inside the gas discharge lamp.

13. The method of claim 12, wherein a combination of duty cycle (D) and current ratio (R) is set such that the commutating current has an average current intensity equal to zero.

14. The method of claim 12, wherein a combination of duty cycle (D) and current ratio (R) is varied in order to vary at least one of an efficacy of the gas discharge lamp and a color temperature of the gas discharge lamp.

15. The method of claim 14, wherein a combination of duty cycle (D) and current ratio (R) is varied such that the average current intensity of the commutating current is substantially constant.

16. The method of claim 12, wherein the gas discharge lamp is arranged in a vertical orientation, and wherein the combination of duty cycle (D) and current ratio (R) is set to reduce segregation in comparison to a segregation that occurs when the duty cycle 0 is 50% and the current ratio is 1.

17. The method of claim 12, wherein the combination of duty cycle (D) and current ratio (R) is set to increase segregation in comparison to a segregation that occurs when the duty cycle D is 50% and the current ratio is 1.

18. The method of claim 12, wherein the gas discharge lamp is arranged in a horizontal orientation, and wherein the combination of duty cycle (D) and current ratio (R) is set such that a shift of the particle distribution is effected in comparison to a segregation that occurs when the duty cycle D is 50% and the current ratio (R) is 1, to vary at least one of a lamp efficacy and a color temperature of the gas discharge lamp.

19. The method of claim 12, wherein the gas discharge lamp is arranged in a horizontal orientation, and wherein a combination of duty cycle (D) and current ratio (R) is set such that a shift of the particle distribution is effected, setting a color point on a color line at a position differing from a horizontal zero color point that occurs when the duty cycle D is 50% and the current ratio is 1.

20. The method of claim 12, wherein the gas discharge lamp is arranged in a vertical orientation, and wherein the combination of duty cycle (D) and current ratio (R) is set such that a shift of the particle distribution is effected, setting a color point on a color line at a position differing from a vertical zero color point that occurs when the duty cycle D is 50% and the current ratio is 1.

21. The method of claim 19, wherein the combination of duty cycle (D) and current ratio (R) is varied in order to make the color point travel along said color line.

22. The method of claim 12, wherein the duty cycle (D) is adjusted to differ from 50% and the current ratio (R) is adjusted to differ from 1.

23. The device of claim 11, wherein the duty cycle (D) is adjusted to differ from 50% and the current ratio (R) is adjusted to differ from 1.

24. The device of claim 11, wherein the commutator is configured to maintain an average current intensity of the commutating current equal to zero.

25. The device of claim 11, wherein the commutator is configured to maintain an average current intensity of the commutating current constant.

26. The device of claim 11, further comprising a mode selection switch outputting the control signal, the mode selection switch having at least two positions each indicating a different orientation of the gas discharge lamp.

27. The device of claim 26, wherein the duty cycle (D) has a predetermined first value ($D_U$) differing from 50% when said mode selection switch is placed in a first position (U) indicative of a vertical orientation of the gas discharge lamp, and wherein the duty cycle has a predetermined second value ($D_D$) differing from 50% when said mode selection switch is placed in a second position indicative of a horizontal orientation of the gas discharge lamp; and wherein $D_D \neq D_U$.

28. The device of claim 11, further comprising a controller for receiving the control signal and for controlling the current generator and commutator to adjust the duty cycle (D) and current ratio (R) based upon the control signal, the controller also being configured to receive a second control; and a control setting device configured to provide the second control signal, the second control signal being continuously variable within a predetermined range;

wherein the device is configured to continuously vary a combination of the duty cycle (D) and the current ratio (R) of the commutating current in response to said second control signal.

29. The device of claim 11, wherein the device is configured to generate the commutating current with a duty cycle equal to 50% during a start phase of the gas discharge lamp.

30. The device of claim 11, further comprising:

a position detector configured to automatically detect the orientation of the gas discharge lamp, and in response thereto to output the control signal indicative of such orientation.

31. The device of claim 30, wherein the device is responsive to the control signal to set a difference between the duty cycle (D) and 50% to a value that depends on the detected orientation of the gas discharge lamp.

32. The device of claim 30, wherein the device is responsive to the control signal to generate a duty cycle having a predetermined first value ($D_U$) differing from 50% when said position detector outputs the control signal having a first value indicative of a vertical orientation of the gas discharge lamp, and to generate a duty cycle having a predetermined second value ($D_D$) differing from 50% when said position detector outputs the control signal having a second value indicative of a horizontal orientation of the gas discharge lamp, and wherein $D_D \neq D_U$.

33. The device of claim 32, wherein $D_D = 100\% - D_U$.

34. The device of claim 30, further comprising a fitting for receiving a lamp cap of a lamp assembly, the fitting having contacts connected to output terminals of the commutator, wherein said position detector is associated with said fitting.

* * * * *